(12) United States Patent
Merrill et al.

(10) Patent No.: US 6,692,933 B2
(45) Date of Patent: Feb. 17, 2004

(54) METHOD FOR PRODUCING A GLUTEN-FREE PEPTIDE PREPARATION AND PREPARATION THUS OBTAINED

(75) Inventors: Debra Ann Merrill, Downsville, NY (US); Edward Allan Hunter, Hancock, NY (US)

(73) Assignee: Campina B.V. (NL)

( * ) Notice: Subject to any disclaimer, the term of this patent is extended or adjusted under 35 U.S.C. 154(b) by 0 days.

(21) Appl. No.: 10/043,660

(22) Filed: Jan. 9, 2002

(65) Prior Publication Data

US 2002/0165125 A1 Nov. 7, 2002

Related U.S. Application Data

(60) Provisional application No. 60/261,631, filed on Jan. 12, 2001.

(51) Int. Cl.⁷ .................................................. C12P 21/06
(52) U.S. Cl. ........................................................ 435/68.1
(58) Field of Search .......................................... 435/68.1

(56) References Cited

FOREIGN PATENT DOCUMENTS

| EP | 0 540 462 A | | 5/1993 |
|---|---|---|---|
| EP | 0 672 352 A | | 9/1995 |
| EP | 0672352 | * | 9/1995 |
| JP | 06 048933 A | | 2/1994 |
| JP | 06 245790 A | | 9/1994 |
| WO | WO 99/05918 A | | 2/1999 |

OTHER PUBLICATIONS

Tanabe et al., "Production of a High–Glutamine Oligopeptide Fraction from Gluten by Enzymatic Treatment and Evaluation of its Nutritional Effect on the Small Intestine of Rats," *Journal of Food Biochemistry*, 1993, pp. 235–248, vol. 16.
AOAC, "Gluten in Foods: Colorimetric Monoclonal Antibody Enzyme Immunoassay Method," *Official Methods of Analysis (1990) 15ᵗʰ Edition: 2ⁿᵈ Supplement*, 1991, pp. 94–96.
Wilcox, "Determination of Amide Residues by Chemical Methods," *Methods of Enzymology*, 1967, pp. 63–76, vol. 11.
Adler–Nissen, *Enzymic Hydrolysis of Food Proteins*, 1986, pp. 12–13, 122–123, Galliard (Printers) Ltd, Great Yarmouth, Great Britain.
Friedli, "Interaction of Deamidated Soluble Wheat Protein (SWP) with Other Food Proteins and Metals: A Thesis presented for the Award of Doctor of Philosophy to the University of Surrey," 1996.

* cited by examiner

Primary Examiner—Herbert J. Lilling
(74) Attorney, Agent, or Firm—Webb Ziesenheim Logsdon Orkin & Hanson, P.C.

(57) ABSTRACT

The invention relates to a method for producing a glutamine-rich gluten-free peptide preparation from gluten protein, comprising the steps of enzymatically hydrolysing wheat gluten using one or sore proteases to obtain a hydrolysate; acidifying the hydrolysate to a pH between 4 and 5; and filtering the hydrolysate to obtain the glutamine-rich gluten-free peptide preparation as the filtrate. The protease is preferably a neutral or basic protease and the optimum pH is from, 4.5 to 4.7.

16 Claims, No Drawings

METHOD FOR PRODUCING A GLUTEN-FREE PEPTIDE PREPARATION AND PREPARATION THUS OBTAINED

CROSS-REFERENCE TO RELATED APPLICATIONS

This application claims the benefit of U.S. Provisional Application No. 60/261,631, filed Jan. 12, 2001 entitled "Gluten-Free Peptide Preparation" and European Application No. 01200387.7, filed Feb. 2, 2001, entitled "Method For Producing A Gluten-Free Peptide Preparation And Preparation Thus Obtained".

BACKGROUND OF THE INVENTION

The present invention relates to a method for producing a peptide preparation that is both glutamine-rich and gluten-free and to the preparation thus obtained. The invention also relates to the use of the preparation in various products and to the products containing the preparation.

Gluten is a combination of proteins found in the endosperm of various grains, such as wheat, barley and rye, oats and other gluten-containing wheat variants, such as triticale, spelt and kamut. In wheat, gluten accounts for 90% of the protein and sakes up almost 15% of the total weight of a grain. It is thus an important source of protein.

However, gluten is the cause of a genetic disorder known as coeliac disease or gluten intolerance. Symptoms of coeliac disease can range from the classic features, such as diarrhea, weight loss, and malnutrition, to latent symptoms such as isolated nutrient deficiencies. The disease mostly affects people of European descent, and occurs more rarely in black and Asian populations. Those affected suffer damage to the villi (shortening and villous flattening) in the lamina propria and crypt regions of their intestines when they eat specific food-grain antigens (toxic amino acid sequences) that are found in wheat, rye, and barley, oats and other gluten-containing wheat variants, such as triticale, spelt and kamut. The gluten found in rice and corn do not cause the intolerance.

For persons with coeliac disease the toxic part of the gluten molecule is the prolamin portion: gliadin in wheat, secalin in rye and horedin in barley. Following a gluten-free diet, people can recover from the symptoms of the disease, but they cannot be cured. Re-introduction of gluten in the diet will again lead to symptoms.

Glutamine is an amino acid that occurs abundantly in gluten. Although it is not an essential amino acid it is nevertheless desirable for certain individuals, in particular those who are recovering from surgery, suffering from gastrointestinal disorders, immune function deficiencies, metabolic stress states, shock or performing endurance sports. Such individuals would benefit from supplementation with this amino acid, for example by taking a peptide preparation rich in glutamine.

Gluten is a very cost-effective source for such glutamine-rich peptide preparations. However, the known preparations are not suitable for coeliac patients since they still contain the toxic parts of the gliadin.

It is therefore the object of the present invention to provide a peptide preparation that is rich in bound glutamine but at the same time gluten free.

SUMMARY OF THE INVENTION

Such peptide preparation can be obtained by a method, comprising the steps of:
a) enzymatically hydrolysing gluten using one or more proteases to obtain a hydrolysate;
b) acidifying the hydrolysate to a pH between 4 and 5; and
c) filtering the hydrolysate to obtain the glutamine-rich gluten-free peptide preparation as the filtrate.

DETAILED DESCRIPTION OF THE INVENTION

A glutamine-rich gluten-free is obtained by a method, comprising the steps of:
a) enzymatically hydrolysing gluten using one or more proteases to obtain a hydrolysate;
b) acidifying the hydrolysate to a pH between 4 and 5; and
c) filtering the hydrolysate to obtain the glutamine-rich gluten-free peptide preparation as the filtrate.

The term "gluten-free" is intended to indicate that the product when tested in an ELISA based on anti-$\Omega$-gliadin antibodies yields a value of <200 ppm. A suitable ELISA to test the gluten-free property is as described in the Association of Official Analytical Chemists' (AOAC's) Official Methods of Analysis, 15th Edition, 2nd supplement (1991), It is clear that the proteases to be used can be selected from a wide range of proteases known in the art provided that hydrolysis performed with such protease results in a preparation that yields <200 ppm in the above described ELISA. Proteases include acid, basic and neutral proteases derived from bacterial, fungal, animal or botanical sources. It was found that basic or neutral proteases active at a pH above 6 are particularly well suited. Examples of such proteases are Proleather N (Amano), Neutrase (NOVO), PROMOD 192P (Biocatalysts), Alcalase 2.4L (NOVO), Protease S (Amano), Peptidase A (Amano), Peptidase R (Amano). Of these the following proteases are preferred: Proleather N (Amano) and Alcalase 2.4L (NOVO).

The protein fragments that cause the hypersensitivity in coeliac patients are surprisingly removed when the hydrolysate is acidified and subsequently filtered. It is assumed that these fragments are precipitated and remain in the retentate of the filter. The pH to which the hydrolysate is to be acidified lies between 4 and 5, preferably between 4.1 and 4.9, more preferably between 4.3 and 4.8, most preferably between 4.5 and 4.7, and is optimally 4.6.

Hydrolysis is an essential step in the method of the invention as without hydrolysis the toxic fragments cannot be removed.

Peptide preparations that are obtainable by the method of the invention consisting of peptides that do not induce gluten hypersensitivity symptoms in coeliac patients are a further aspect of this invention. Such preparations are suitable as a food additive or food stuff for supplying additional glutamine to a subject. The preparation thus has sports and clinical applications and can be used in enteral nutrition and pet food.

The peptide preparation of the invention can be used in further products that can be taken by or administered to subjects in need of supplementation. Particular embodiments of such products are glutamine peptide tablets comprising the usual carriers, diluents and excipients for tablets and a peptide preparation of the invention as glutamine peptide source, glutamine peptide liquid beverage comprising the usual ingredients for beverages and a peptide preparation of the invention as glutamine peptide source, and glutamine peptide enteral nutrition comprising the usual carriers, diluents and excipients for enteral nutrition and a peptide preparation of the invention as glutamine peptide source.

Although the invention is more broadly applicable to gluten from all grains that may cause coeliac disease, it is preferred to use wheat because of its high glutamine content.

EXAMPLES

Example 1

Production of a Glutamine-Rich, Gluten-Free Peptide Preparation

A series of experiments was carried out to illustrate the critical process parameters.

A series of peptide hydrolysates was produced by heating deionized water to a temperature of 63° C.±1° C. To this water, a mix of 45% liquid potassium hydroxide, 50% liquid sodium hydroxide, hydrated calcium hydroxide in a ratio of 1:0.78:0.70, respectively, is added to obtain a pH suitable for the protease to be used.

Vital wheat gluten ("VWG", Cargill B. V., Bergen op Zoom, Netherlands) is added to this solution to produce a 12% solids mix of solubilized gluten.

Hydrolysis is performed with a desired protease as indicated in the description of the separate experiments hereinbelow. The hydrolysis reaction is performed for 3 hours at a temperature that is suitable for the protease used, usually 60° C.±2° C.

After the hydrolysis, acid, in particular sulphuric acid is added to achieve the desired pH (see description of experiments) with agitation. The reaction is stopped by a HTST (high temperature short time) heating at 116° C.±2° C. Subsequently the solution is cooled to 66° C.±2° C. and filtered using diatomaceous earth (Eagle-Picher Minerals Inc., Reno, Nev., USA) at 40% bodyfeed. The solution is recirculated through the filter press for a minimum of 3 minutes.

The pH of the filtrate is adjusted to 6.4-6.8 by means of an alkaline solution. After evaporating the liquid and drying, a powdered peptide preparation of the invention is obtained.

In order to test whether the product is gluten-free an ELISA was performed according to AOAC 991.19 (Official Methods of Analysis (1990) 15th Edition, 2nd a Supplement (1991)).

The bound glutamine content was determined according to P. E. Wilcox, "Determination of Amide Residues by Chemical Methods." Methods of Enzymology 11, 63-76 (1967).

A measure for the degree of hydrolysis of protein is the AN/TN ratio. AN is the amino-nitrogen level, which can be determined using the formol titration method, or according to J. Adler-Nissen, Enzymatic hydrolysis of food proteins. Elsevier Applied Science Publishers, 1986. TN is the total amino-nitrogen content which is determined according to the Kjeldahl nitrogen determination method. The higher the ratio AN/TN, the higher the degree of hydrolysis of the protein preparation.

Experiments

Experiment 1

Wheat gluten is dispersed in water. The pH is adjusted to 4.6 with sulphuric acid and the solution filtered.

Experiment 2

Wheat gluten is dispersed in water. The pH is adjusted to 3.2-3.4 with sulphuric acid. The gluten is digested using Acid Protease II (Amano), The enzyme is heat inactivated and the solution is filtered.

Experiment 3

Wheat gluten is dispersed in caustic water. The gluten is digested using the alkaline and neutral proteases Alcalase 2.4L (NOVO) and Proleather N (Amano), and amylases BAN 240L (NOVO). After inactivation of the enzyme the pH is adjusted to near neutral with sulphuric acid and the solution is filtered.

Experiment 4

Wheat gluten is dispersed in caustic water. The gluten is digested using the alkaline and neutral proteases Alcalase 2.4L (NOVO) and Proleather N (Amano). The pH is adjusted to 3.8-4.1 with sulphuric acid. After heat inactivation of the enzyme the solution is filtered. The pH is then adjusted to neutral with caustic.

Experiment 5

Wheat gluten is dispersed in caustic water. The gluten is digested using the alkaline and neutral proteases Alcalase 2.4L (NOVO) and Proleather N (Amano). The pH adjusted to 6.5 with sulphuric acid. After heat inactivation of enzymes, the solution is filtered. The pH is adjusted to neutral using caustic.

Experiment 6

Wheat gluten is dispersed in caustic water. The gluten is digested using the alkaline and neutral proteases. Alcalase 2.4L (NOVO) and Proleather N (Amano). The pH is adjusted to 4.3 with sulphuric acid. After heat inactivation of enzymes and filtration, the pH is adjusted to neutral using caustic.

Experiment 7

Wheat gluten is dispersed in caustic water. The gluten is digested using the alkaline and neutral proteases Alcalase 2.4L (NOVO) and Proleather N (Amano). Subsequently the pH is adjusted to 4.5 with sulphuric acid, After heat inactivation of enzymes and filtration, the pH is adjusted back to neutral using caustic.

Experiment 8

Wheat gluten is dispersed in caustic water. The gluten is digested using the alkaline and neutral proteases Alcalase 2.4L (NOVO) and Proleather N (Amano). The pH is adjusted to 4.6 with sulphuric acid. After heat inactivation of enzymes the solution is filtered. Then the pH is adjusted to neutral using caustic.

Experiment 9

Wheat gluten is dispersed in caustic water. The gluten is digested using the alkaline and neutral proteases Alcalase 2.4L (NOVO) and Proleather N (Amano). The pH is adjusted to 4.8 with sulphuric acid. After heat inactivation of enzymes and filtration, the pH is adjusted to neutral using caustic.

Table 1 shows the result of the experiments. It is clear from the above example that both hydrolysis of the gluten and filtration at an acid pH are essential for the product to be gluten free.

TABLE 1

| Sample | AN % | Gluten (ppm) | Bound Glutamine (%) |
|---|---|---|---|
| 1 | 0.5 | 1200 | 19 |
| 2 | 0.67 | >320 | 31 |
| 3 | 1.4 | 438 | 25 |
| 4 | 1.62 | 300 | 25 |

TABLE 1-continued

| Sample | AN % | Gluten (ppm) | Bound Glutamine (%) |
|---|---|---|---|
| 5 | 1.59 | 310 | 27 |
| 6 | 1.7 | <20 | 28 |
| 7 | 2.03 | <20 | 27 |
| 8 | 1.95 | <20 | 26 |
| 9 | 1.96 | <20 | 27 |

TN = 13%

Example 2

Application of Gluten-Free Glutamine-Rich Peptide Preparation of the Invention

In the following, three examples of applications for the preparation of the invention are given.

1. Glutamine Peptide Tablets

Ingredients (1) Enzymatically Hydrolysed Wheat Protein (granular) (preparation according to the invention
(2) Pharmacel 102
(3) CAB-0-SIL M-5

| Recipe: | |
|---|---|
| Enzymatically hydrolyzed wheat protein (1) | 91.1% |
| Microcrystalline cellulose (2) | 5.0% |
| Di-calcium phosphate | 2.0% |
| Silicon Dioxide (3) | 0.9% |
| Stearic Acid | 0.5% |
| Magnesium Stearate | 0.5% |
| Total | 100% |

Preparation Method

The powders are premixed (withholding the Mg Stearate until the last minutes of mixing). The tablets are prepared by direct compression.

| Properties of the tablets: | |
|---|---|
| Glutamine Peptide per tablet | 170 mg |
| Tablet weight | 758 mg |
| Tablet length (Oblong) | 19.04 mm |
| Compression pressure | 13.3 kN |
| Hardness | 140 N |

2. Glutamine Peptide Liquid Beverage

Ingredients (1) Enzymatically hydrolyzed wheat protein (preparation of the invention)
(2) Enzymatically hydrolyzed whey protein (WE80BG, DMY International)
(3) Grapefruit Flavor Tastemaker 946068

| Recipe: | |
|---|---|
| Water (QS to 1 liter) | 920.00 g |
| Enzymatically Hydrolyzed Wheat Gluten (1) | 13.21 g |
| Enzymatically Hydrolyzed Whey (2) | 13.04 g |
| Sucrose | 26.60 g |
| Glucose | 15.00 g |
| Fructose | 5.00 g |
| Glucose Polymers (Maltodextrin DE18) | 10.00 g |
| Malic Acid | 3.33 g |
| Citric Acid | 0.67 g |
| Sodium Citrate | 1.00 g |
| Grapefruit Flavor (3) | 0.60 g |
| Aspartame | 0.10 g |
| Acesulfame Potassium | 0.10 g |
| | 1000.0 ml |

Preparation method

All ingredients are added to the water and mixed well. The acids are added last to achieve a pH of 3.9. The liquid is bottled, heat processed for 1 min. at 85° C. and cooled,

| Nutrition Facts (per 100 ml): | |
|---|---|
| Protein | 2.09 g |
| Glutamine Peptide | 0.26 g |
| Carbohydrates | 6.0 g |

3. Clinical Enteral Nutrition Prototype with Glutamine Peptide and Whey Peptides Ingredients (1) Enzymatically hydrolyzed wheat protein (preparation of the invention
(2) Enzymatically hydrolyzed whey protein (WE80BG, DMV International)

| Recipe: | |
|---|---|
| Water (QS to 1 liter) | 720.00 g |
| Enzymatically Hydrolyzed Wheat Gluten (1) | 40.00 g |
| Enzymatically Hydrolyzed Whey (2) | 35.60 g |
| Food Starch, Modified | 84.00 g |
| Maltodextrin | 59.00 g |
| Soy Oil | 30.00 g |
| MCT Oil | 10.00 g |
| Potassium Citrate | 2.20 g |
| Sodium Citrate | 1.60 g |
| Magnesium Chloride | 3.20 g |
| Calcium Phosphate | 2.80 g |
| Potassium Phosphate | 2.00 g |
| Sodium Phosphate | 1.00 g |
| Carrageenan | 0.50 g |
| | 1000.0 ml |

Preparation Method

The minerals are dissolved in water with constant stirring. The premixed carbohydrates are added to the mixture. The mixture is heated to 70° C. and held for 10 minutes with constant stirring. The protein is added to the mixture, which is then heated to 70° C. with constant stirring, The oil is added to the mixture, which is then mixed well. The mixture is then double homogenised at 4000 psig (276 bar). The pH is adjusted to the appropriate value. The solids content is adjusted to an appropriate value. The product is sterilised and the heat process retorted at 121° C. for 10 minutes.

| Nutrition Facts (per 100 ml): | |
| --- | --- |
| Protein | 6.0 g |
| Glutamine Peptide | 1.0 g |
| Carbohydrates | 13.8 g |
| Fat | 4.0 g |

What is claimed is:

1. A method for producing a glutamine-rich gluten-free peptide preparation from gluten protein, comprising the steps of:
   a) enzymatically hydrolysing gluten using one or more proteases to obtain a hydrolysate;
   b) acidifying the hydrolysate to a pH between 4 and 5; and
   c) filtering the hydrolysate to obtain the glutamine-rich gluten-free peptide preparation as the filtrate.

2. The method as claimed in claim 1, wherein the proteases are alkaline or neutral proteases.

3. The method as claimed in claim 1, wherein the pH is between 4.2 and 4.8.

4. The method as claimed in claim 1, wherein the pH is between 4.5 and 4.7.

5. The method as claimed in claim 1, wherein proteases are used that are active at a pH above 6.

6. The method as claimed in claim 1, wherein between step b) and c) the enzymes are inactivated.

7. The method as claimed in claim 6, wherein the enzymes are inactivated by means of heat.

8. The method as claimed in claim 1, wherein the gluten is wheat gluten.

9. A preparation prepared from gluten protein, which is glutamine-rich and gluten-free and is obtained by the method of claim 1.

10. The peptide preparation as claimed in claim 9, wherein the gluten from which the preparation is made is wheat gluten.

11. The peptide preparation as claimed in claim 9 for use as an ingredient in glutamine peptide tablets.

12. The peptide preparation as claimed in claim 9 for use as an ingredient in glutamine peptide liquid beverages.

13. The peptide preparation as claimed in claim 9 for use as an ingredient in glutamine peptide enteral nutrition.

14. Glutamine peptide tablets comprising the carriers, diluents and excipients for tablets and a peptide preparation as claimed in claim 9 as glutamine peptide source.

15. A glutamine peptide liquid beverage comprising ingredients for beverages and a peptide preparation as claimed in claim 1 as glutamine peptide source.

16. A glutamine peptide enteral nutrition comprising carriers, diluents and excipients for enteral nutrition and a peptide preparation as claimed in claim 9 as glutamine peptide source.

* * * * *

UNITED STATES PATENT AND TRADEMARK OFFICE
CERTIFICATE OF CORRECTION

PATENT NO. : 6,692,933 B2
DATED : February 17, 2004
INVENTOR(S) : Debra Ann Merrill et al.

It is certified that error appears in the above-identified patent and that said Letters Patent is hereby corrected as shown below:

Column 2,
Line 7, "gluten-free is" should read -- gluten-free peptide is --.

Column 8,
Line 5, "A preparation" should read -- A peptide preparation --.
Line 23, "in claim 1" should read -- in claim 9 --.

Signed and Sealed this

Twentieth Day of July, 2004

JON W. DUDAS
*Acting Director of the United States Patent and Trademark Office*